# United States Patent
Aggarwal (10) Patent No.: US 10,565,007 B2
(45) Date of Patent: *Feb. 18, 2020

(54) REMOTELY MONITORING AND SCHEDULING A DATA INTEGRATION JOB

(71) Applicant: International Business Machines Corporation, Armonk, NY (US)

(72) Inventor: Chandan Aggarwal, Safidon (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/458,101

(22) Filed: Mar. 14, 2017

(65) Prior Publication Data

US 2017/0185446 A1 Jun. 29, 2017

Related U.S. Application Data

(63) Continuation of application No. 14/934,912, filed on Nov. 6, 2015, now Pat. No. 9,639,406, which is a
(Continued)

(51) Int. Cl.
| | |
|---|---|
| *G06F 9/48* | (2006.01) |
| *G06F 17/30* | (2006.01) |
| *G06F 9/50* | (2006.01) |
| *G06F 9/44* | (2018.01) |
| *G06F 9/54* | (2006.01) |

(Continued)

(52) U.S. Cl.
CPC ............ *G06F 9/4843* (2013.01); *G06F 9/451* (2018.02); *G06F 9/5005* (2013.01); *G06F 9/541* (2013.01); *G06F 9/542* (2013.01); *G06F 9/546* (2013.01); *G06F 16/254* (2019.01)

(58) Field of Classification Search
CPC .......... G06F 9/547; G06F 9/548; G06F 9/465
See application file for complete search history.

(56) References Cited

U.S. PATENT DOCUMENTS

| | | | |
|---|---|---|---|
| 7,305,455 B2 | 12/2007 | Lynch et al. | |
| 7,814,142 B2 * | 10/2010 | Mamou ................. | G06F 16/254 709/203 |

(Continued)

OTHER PUBLICATIONS

Aggarwal, U.S. Appl. No. 12/343,861, filed Dec. 24, 2008.
(Continued)

*Primary Examiner* — Umut Onat
(74) *Attorney, Agent, or Firm* — Michael O'Keefe (57) ABSTRACT

Systems of computer hardware for remotely monitoring and scheduling data integration (DI) jobs are presented including: an integration module that transforms a request for remotely monitoring or scheduling a DI job from an enterprise application into customized commands by the enterprise application suitable for accessing another enterprise application, where the DI job is executed at a DI server at the request of the enterprise application; a listener agent electronically coupled with the integration module and a DI server, where the listener agent receives the customized commands, and monitors or schedules the DI job in the enterprise application through DI job-control application programming interfaces (API) specific to the enterprise application; and a customized commands repository that stores the customized commands.

10 Claims, 5 Drawing Sheets

Related U.S. Application Data continuation of application No. 12/343,861, filed on Dec. 24, 2008, now Pat. No. 9,286,140.

(51) Int. Cl.
  *G06F 16/25* (2019.01)
  *G06F 9/451* (2018.01)

(56) References Cited

U.S. PATENT DOCUMENTS

| | | | |
|---|---|---|---|
| 9,286,140 | B2 | 3/2016 | Aggarwal |
| 9,639,406 | B2 | 5/2017 | Aggarwal et al. |
| 2005/0198121 | A1* | 9/2005 | Daniels ............... G06Q 10/10 709/203 |
| 2005/0262194 | A1 | 11/2005 | Mamou et al. |
| 2006/0133412 | A1 | 6/2006 | Callaghan |
| 2006/0141997 | A1 | 6/2006 | Amiens |
| 2006/0265719 | A1 | 11/2006 | Astl et al. |
| 2007/0226244 | A1 | 9/2007 | Chandrasekharan et al. |
| 2009/0007098 | A1* | 1/2009 | Chevrette ............... G06F 8/65 717/177 |
| 2009/0019039 | A1* | 1/2009 | Brindley ............ G06Q 30/0241 |
| 2010/0162267 | A1 | 6/2010 | Aggarwal |
| 2016/0062808 | A1 | 3/2016 | Aggarwal et al. |

OTHER PUBLICATIONS

Aggarwal, U.S. Appl. No. 14/934,912, filed Nov. 6, 2015.
Final Office Action from U.S. Appl. No. 12/343,861, dated Feb. 24, 2012.
Final Office Action from U.S. Appl. No. 12/343,861, dated Dec. 18, 2013.
Husar Lubomir, Monitor your DataStage jobs without Director, Nov. 2007, http://it.toolbox.com/blogs/traveling-consultant/monitor-your-datastage-jobs-without-director-20418.
Non-Final Office Action from U.S. Appl. No. 12/343,861, dated Jun. 6, 2013.
Non-Final Office Action from U.S. Appl. No. 12/343,861, dated Sep. 7, 2011.
Non-Final Office Action from U.S. Appl. No. 12/343,861, dated Dec. 4, 2014.
Non-Final Office Action from U.S. Appl. No. 14/934,912, dated May 6, 2016.
Notice of Allowance from U.S. Appl. No. 12/343,861, dated Aug. 10, 2015.
Notice of Allowance from U.S. Appl. No. 14/934,912, dated Dec. 27, 2016.

* cited by examiner

REMOTELY MONITORING AND SCHEDULING A DATA INTEGRATION JOB

The instant application is a continuation of U.S. patent application Ser. No. 14/934,912, filed on Nov. 6, 2015, which is now U.S. Pat. No. 9,639,406 B2, issued on May 2, 2017, which is a continuation of U.S. patent application Ser. No. 12/343,862, filed on Dec. 24, 2008, which is now U.S. Pat. No. 9,286,140 B2, issued on Mar. 15, 2016.

BACKGROUND

Day-to-day business operations of an organization generate a large amount of information. Organization stores this information on a number of different systems, which may be deployed on disparate platforms. Further, these systems may use different protocols, data structures, and databases, each system customized to cater to a specific business process within the organization. For example, a customer relationship management (CRM) system may include information unique to a customer domain, while another system, including an enterprise resource planning (ERP) application, could store sales, and inventory related information.

Organizations employ various enterprise application integration (EAI) solutions to share data across different systems. EAI solutions enable the organization to maintain a comprehensive view of the information, relating to a number of operations and resources, stored in different systems. A considerable amount of time and complexity, however, is involved in implementing EAI solutions due to system, and data-level incompatibilities. Heterogeneity among the data in the different systems must be resolved in order to carry out enterprise-wide integration operations. Moreover, different data sources must employ their own implementations to shield the data to provide their users with an appearance of a single integrated data source.

To that end, organizations often employ one or more data warehouses to integrate enterprise data using extract, transform, and load (ETL) processes. In the absence of a real-time connection or interaction between the EAI and data warehousing processes, however, remote monitoring or scheduling of data integration (DI) jobs from different enterprise applications is quite difficult. Thus, most organizations retain two disjointed infrastructures that cannot leverage each other in real-time.

Some current techniques enable interaction between enterprise applications and DI jobs by exposing a remote monitoring or scheduling application as a service consumed by the enterprise applications. An example of such a system is—WEBSPHERE™ Datastage, produced and offered by IBM Corporation as a part of the IBM Information Server. A component of that system, known as the WEBSPHERE™ Information Server Director (WISD), employs service-oriented architecture (SOA) to expose DI jobs as a service consumed by other external applications. This service may be deployed on any application server or may be called by other enterprise applications having Web Services clients, which may request the WISD component for remotely scheduling a DI job.

Exposing DI jobs as a web service for remote monitoring and scheduling, however, can be a complex procedure requiring considerable enterprise resources, and expert user intervention. Further, implementing web services from applications employing lightweight user interfaces, such as email, instant messaging clients, mobile application clients, or other applications that do not provide efficient support to web services, requires specific technical insights. Further, in the absence of tight coupling between the different systems, upgraded jobs necessitate changes in implementation of the web service for updating input and output stages. The user, thus, requires both technical expertise and awareness of various business processes for managing these SOA services efficiently.

SUMMARY

Methods for deriving an integration module using an electronic computing device, the method are presented, the methods including: providing a framework coupled with a system of computer hardware for remotely monitoring and scheduling a number of data integration (DI) jobs between a number of enterprise applications, where the framework provides an extensible and reusable architecture for the integration module; adding to the integration module at least one function or component corresponding with a user specified requirement via the framework; deploying the integration module as an embedded client to one of the number of enterprise applications by the framework. In some embodiments, the framework further provides functionalities selected from: a unified security model and transaction control mechanisms. In some embodiments, the framework provides the one of the enterprise applications with the integration module serving as an embedded client in communication with a listener agent, serving as a server in a DI environment. In some embodiments, the listener agent, by employing a job-control API and a DI server, extends the ability of remotely executing the number of DI jobs in one of the enterprise applications to all other enterprise applications. In some embodiments, the integration module provides selectable interfaces to configure any of the number of DI jobs and at least one associated parameter. In some embodiments, the at least one associated parameter is selected from: scheduled time, output format, and notifications. In some embodiments, the integration module provides selectable options for generating notifications periodically. In some embodiments, the integration module provides batch mode notifications for the number of DI jobs selected from: an email, a popup, and a dialog box. In some embodiments, the integration module is configured to process any of: a user request, a user credential, and a selected option. In some embodiments, the integration module appends relevant parameters to the user request.

DETAILED DESCRIPTION

The following detailed description is made with reference to the figures. Embodiments of the invention described herein do not to limit its scope, which is defined by the claims. Those of ordinary skill in the art will recognize a variety of equivalent variations on the description that follows.

Generally, the embodiments of the invention set out below discloses a method and a system for remotely monitoring or scheduling data integration (DI) jobs in an enterprise application. The method employs available DI job-control application programming interfaces (APIs) for facilitating better workflow management between the different enterprise applications. The method and system provide an extensible embeddable client interface for the enterprise application along with a listener agent coupled to one or more data integration servers. The client interface communicates a request for remotely monitoring or scheduling DI jobs to at least one of the data integration servers that services the request by employing the DI job-control APIs. This measure enables robust integration and extension of existing DI job-control APIs, each conventionally employed only by particular enterprise applications, to all other enterprise applications.

Figure 1:
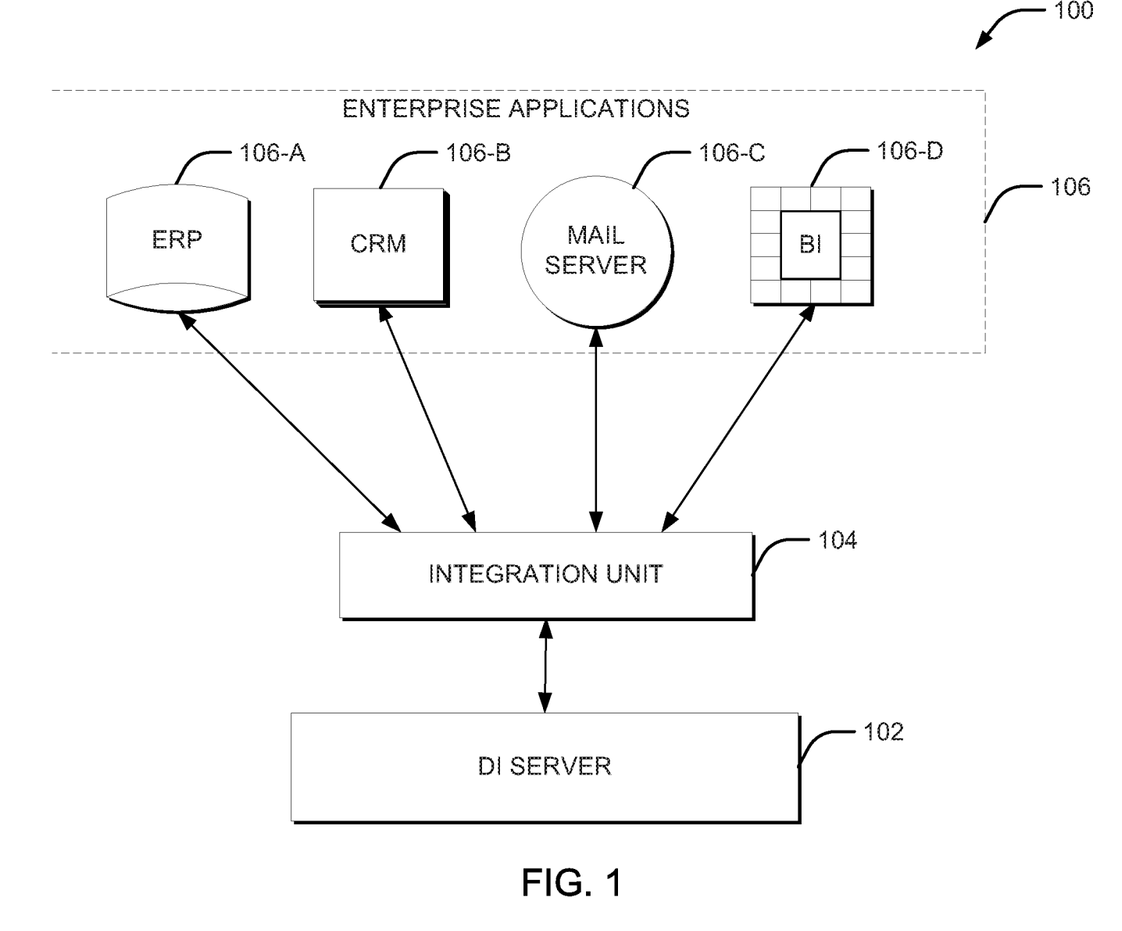
FIG. 1 is a block diagram illustrating an exemplary data integration (DI) environment for implementing the claimed method for remotely monitoring and scheduling DI jobs in an enterprise.

FIG. 1 illustrates an embodiment of a DI environment 100 in an enterprise suitable for the operation of embodiments of the claimed invention. The DI environment 100 includes a DI server 102, an integration unit 104, and enterprise applications 106. Although FIG. 1 depicts only few devices, it would be apparent that the DI environment 100 could include additional devices, such as additional servers, and other enterprise applications for facilitating various DI processes. The DI server 102 manages DI systems, processes, and applications executing in the DI environment 100. Conventionally, the DI server 102 can further be responsible for functions such as optimizing the use of an enterprise execution grid, and ensuring optimal scalability and availability of various DI processes. These functions alleviate any concerns related to resource pre-emption when a large number of DI jobs run concurrently, or when non-dedicated servers are used. The DI server 102 may also monitor resources of other available servers to intelligently load balance the execution of DI jobs running on different enterprise applications.

The enterprise applications 106 can include applications, such as, an enterprise resource planning (ERP) application 106-A for managing resources, inventory and shipping, a customer relationship management (CRM) application 106-B for managing current and potential customers, a mail server 106-C, a business intelligence (BI) application 106-D for finding patterns from existing data, and other such applications for managing enterprise data relating to human resources, health care, internal communications, and so on. The enterprise applications 106 can be deployed as computer programs, software, and firmware stored or running on a standalone or networked systems.

The integration unit 104 provides one or more interfacing functions between the DI server 102, and the enterprise applications 106. The DI environment 100 can include separate integration units for each of the enterprise applications 106 for interfacing with the DI server 102. For instance, the integration unit 104 can enable an enterprise application, say the CRM application 106-B to access data generated by a DI job in another enterprise application, such as the BI application 106-D. In order to provide a uniform interface, the integration unit 104 is customized for each of the enterprise applications 106. In some embodiments, the DI environment 100 can further include a framework, as discussed in connection with FIG. 5, for customizing and embedding the integration unit 104 within each of the enterprise applications 106. Together, the integration unit 104, and the DI server 102 ensure intelligent storage and access to the data generated by the different systems and applications, thus, enabling the enterprise to work as a cohesive unit.

In order to manage data in the enterprise applications 106, the DI environment 100 can include business intelligence tools to extract, transform, and load (ETL) data into data warehouses, and to manage and retrieve metadata. These business intelligence tools collect data from various sources, and then cleanse, transform, or otherwise manipulate the data, and pass it to the enterprise applications 106 in real-time, or batch mode. The extraction, transformation, and loading of data into various data sources involve a number of operational phases, in which various DI Jobs identify and resolve inconsistencies in extracted data. Subsequently, other DI jobs transform the data into customized formats to fit varied business requirements. These DI jobs can include one or more of a data extraction job, a data transformation job, a loading job, data profiling job, a mapping job, a data-auditing job, a data-cleansing job, a data-matching job, a metadata management job, or any other DI job as known in the art.

Some of the DI jobs store the data in data warehouses (not shown in FIG. 1), managed by the DI server 102, for facilitating reporting and analysis functions. A data warehouse provides a common data model for all data of interest regardless of the data's source. Data warehouses also facilitate decision support system applications such as report generation, which can generate trend reports (e.g., the items with the most sales in a particular area within the last two years), exception reports, and reports that show actual performance versus goals. Data warehouses can work in conjunction with and, thus, enhance the value of business processes, notably the CRM application 106-B. Data warehousing technology is well known in the art, and numerous implementations are available from suppliers such as, ORACLE™ Corporation, and others.

Figure 2:
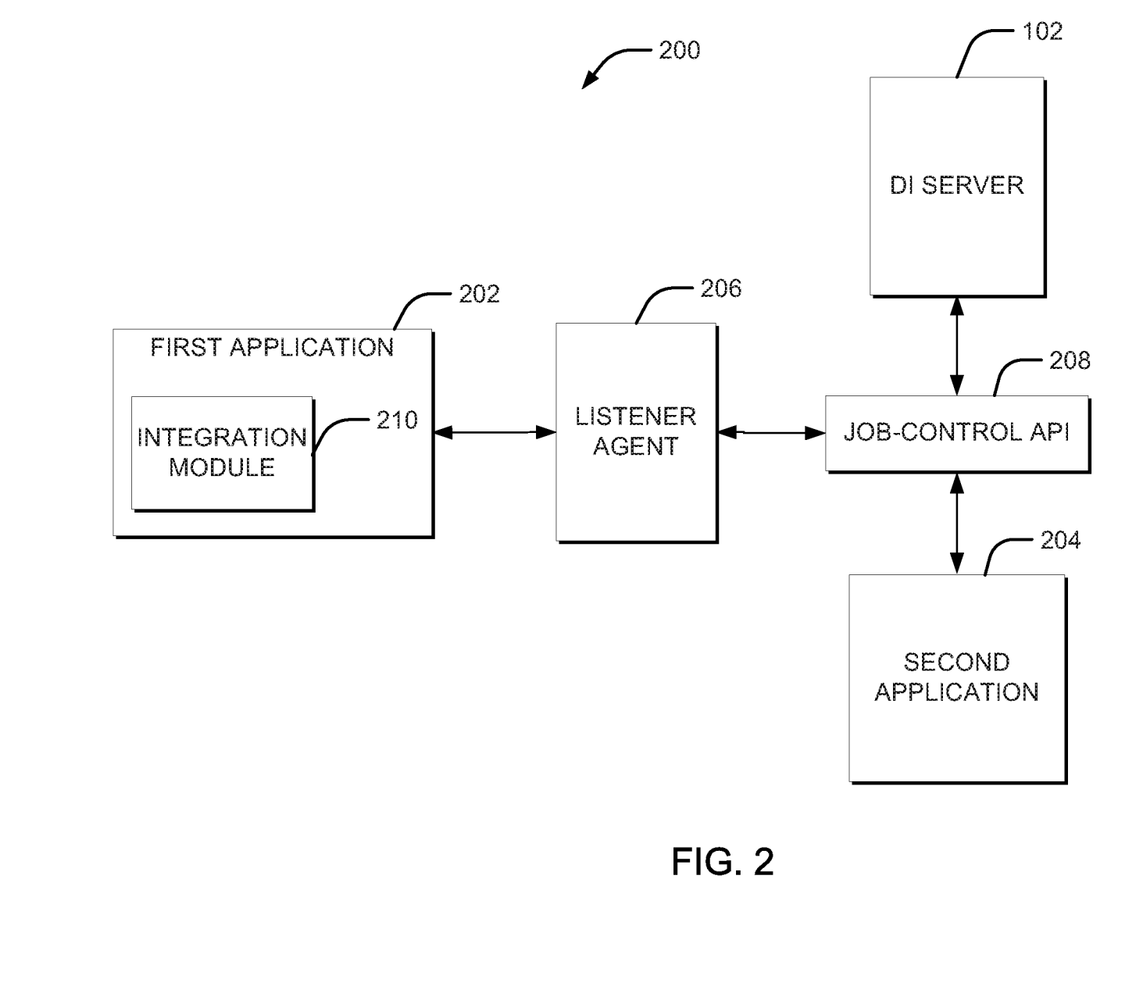
FIG. 2 is a block diagram illustrating an exemplary embodiment of a system for remotely monitoring and scheduling DI jobs in an enterprise.

FIG. 2 illustrates a system 200 for remotely monitoring or scheduling DI jobs in an enterprise. The system 200 includes the DI server 102 coupled to the following modules: a first application 202, a second application 204, a listener agent 206, and one or more job-control APIs 208. In some embodiments, the listener agent 206, and the job control APIs 208 can reside on the DI server 102. In other embodiments, the listener agent 206 and the job control APIs 208 can reside on one or more systems coupled to the DI server 102 over a communication network. For simplicity, FIG. 2 depicts only two enterprise applications, though it will be apparent to those skilled in the art that the system 200 can include any number of enterprise applications.

Owing to differences in structures, and data handling and storage techniques, different enterprise applications require one or more customizations in associated integration modules. The integration modules can further include customizations for fulfilling specific user requirements. To that end, the first application 202 includes an integration module 210 for facilitating communication with the listener agent 206. In some embodiments, the integration module 210 can include customizations to provide options for searching for various DI jobs in the enterprise, while in other embodiments, the integration module 210 may enable addition of available hosts (e.g., clusters, supercomputers, workstations, grids, and so on). Alternatively, the integration module 210 can also query some or all enterprise systems periodically for adding applications and DI processes for remote management.

The integration module 210 receives a request from the first application 202 and subsequently transforms the request into one or more customized commands, the customized commands adhering to standard communication protocols, or including customized eXtensible Markup Language (XML) messages. The listener agent 206 and the integration module 210 operate in a tightly coupled client-server paradigm, and communicate with each other through these customized commands. The customized commands can include one or more parameters characteristic of one or more of the DI job, such as job identifier or job type, the first application 202, and the second application 204.

The listener agent 206 extracts relevant parameters from the customized commands and communicates the request to one or more enterprise servers, such as, the DI server 102 through the job-control APIs 208. The DI server 102, in turn, employs the job-control APIs 208 associated with the second application 204 to facilitate monitoring or scheduling of DI jobs. In some embodiments, the listener agent 206 can invoke a relevant API that the DI server 102 can utilize for remotely accessing information from a particular enterprise application. The job-control APIs 208 provide an interface that includes a set of functions, procedures, or classes to support requests received from the listener agent 206 and the DI server 102. The job-control APIs 208 can further include a commonly used library of functions used by various enterprise applications and systems.

Because the job-control APIs 208 facilitate access to different enterprise applications, users across the enterprise, such as process architects, data stewards, and managers can access the data generated in one enterprise application from any another enterprise application. For instance, a manager may want to manage process control activities such as running a DI job, retrieving a DI job-state, and querying or searching logs in other enterprise applications from the first application 202. To provide such functionality, the integration module 210 can be integrated with the user interface (UI) of the first application 202. In one embodiment, the integration module 210 can include customizable indicators and thresholds to provide a high-level view, further including an ability to drill down to individual DI jobs. A user can employ tools provided by the integration module 210 to schedule, trigger, or monitor a DI job in the second application 204, and further for configuring DI jobs in a workspace using drag and drop, drop down menus, command lines or other common interface components. The integration module 210 can also enable the user to request running of DI jobs, and summarizing status of all requested calculations in one window.

For configuring DI jobs, the integration module 210 can provide a variety of options, such as, icons to select and configure parameters relating to one or more data sources, applications, and the DI jobs. The integration module 210 can further provide options to associate specific functions and other relationships among the data sources, applications, and the DI jobs. For instance, the user can select relevant icons provided by the integration module 210 to configure one or more parameters of the DI job such as job identifier, job type, identifiers related to the second application 204, output format, duration, and so on. The integration module 210 may also provide options to request for monitoring or scheduling DI jobs according to time-based or event-based schedules, while also supporting a number of batch systems and interactive runs. Once the user configures the various parameters, the integration module 210 customizes the request, including all selected parameters, into a predefined format recognized by the listener agent 206 for further processing. In some embodiments, the predefined format includes a customized set of commands that negotiates communication between the listener agent 206 and the integration module 210.

For clarity, the description of FIG. 3, FIG. 4, and FIG. 5 included in the following sections will refer to the implementations of FIG. 2

Figure 3:
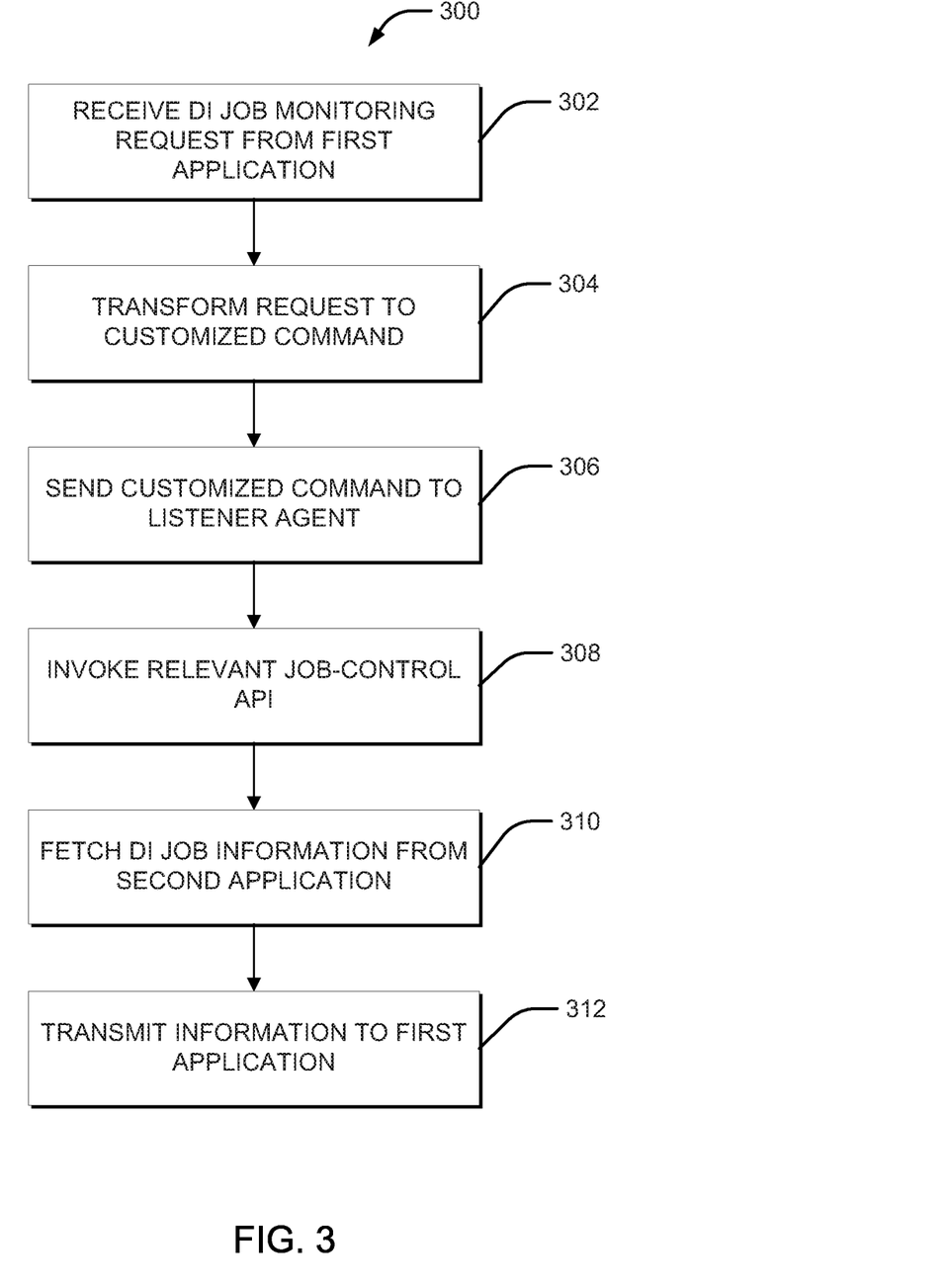
FIG. 3 is a flowchart illustrating an exemplary embodiment of the claimed method for remotely monitoring DI jobs in an enterprise.

FIG. 3 depicts an embodiment of a method for remotely monitoring a DI job in the second application 204 from the first application 202. The integration module 210 serves as a unified interface for allowing a user to request remote monitoring of DI jobs in various enterprise applications. The integration module 210 receives a request from the first application 202, and subsequently employs a custom protocol to customize and communicate the request to the listener agent 206. The custom protocol can include exchanging one or more customized commands characterized by one or more parameters characteristic of at least one of the DI job, the first application 202, and the second application 204. These customized commands can be based on standard communication protocols, or they can include one or more XML messages.

At step 302, the integration module 210 receives a request from the first application 202. The user can select the DI job to be monitored and other associated parameters such as the second application 204 (target application at which the DI job is to be scheduled or monitored), scheduled time of monitoring, number of jobs, output format, etc.

Step 304 relates to transforming the request into one or more of the relevant customized commands or XML messages. The integration module 210 analyzes the request and the associated parameters, subsequently transforming the request into the appropriate customized commands. The integration module 210 sends the customized commands or the XML messages to the listener agent 206 at step 306. In some embodiments, the customized commands or the XML messages may be queued until a specified time, or until the listener agent 206 can further process these commands. The listener agent 206 parses through the customized commands or the XML messages to interpret and extract relevant information relating to the request. The relevant information can include information relating to the DI job to be monitored, access restrictions related to the user, the target application (.e.g., the second application 204) and any other relevant parameters.

At step 308, the listener agent 206 invokes one of the relevant job-control APIs 208 to communicate the request to the DI server 102, based on extracted information. The job-control APIs 208 can include interfaces and a common library of functions to facilitate access to enterprise applications deployed on disparate platforms or using different data sources or protocols.

The DI server 102 fetches requested information from the second application 204 by employing the associated job-control APIs 208 at step 310. The requested information can include one or more parameters related to the DI job such as execution time, and data volumes, number of batches run, success and failure rates, warnings, and so on. At step 312, the listener agent 206 transmits the requested information to the first application 202 as output. In some embodiments, the listener agent 206 may queue the output. The integration module 210 retrieves and customizes the output to a presentation format required by the first application 202, or as requested by the user.

Figure 4:
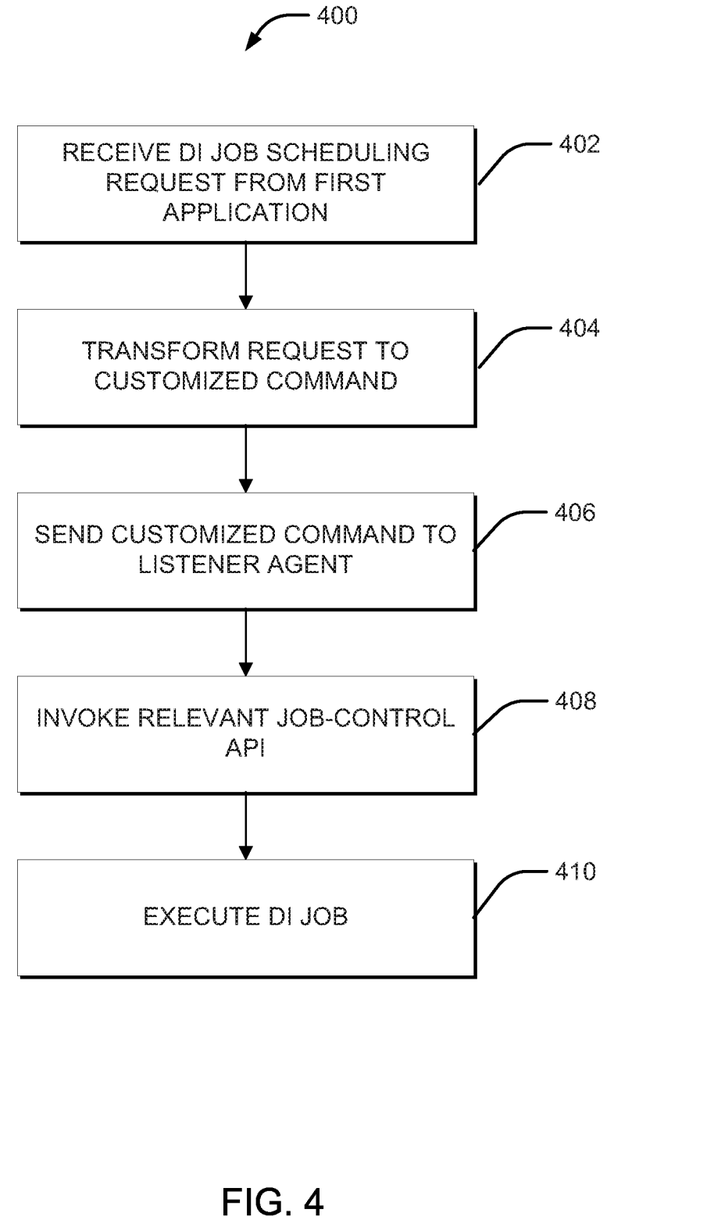
FIG. 4 is a flowchart illustrating an exemplary embodiment of the claimed method for remotely scheduling DI jobs in an enterprise.

FIG. 4 illustrates an embodiment of a method 400 for remotely scheduling a DI job in the second application 204, from the first application 202. A user of the first application

202 requests the listener agent 206 for remotely scheduling a DI job in the second application 204 through the integration module 210. A custom protocol as described in connection with the description of the FIG. 3 negotiates communication between the integration module 210 and the listener agent 206.

At step 402, the integration module 210 receives the user's request and one or more associated parameters, such as, the target application identifier, scheduled time of monitoring, number of jobs, and output format. The integration module 210 transforms the request into one or more customized commands or XML messages at step 404. Subsequently, the integration module 210 sends the customized commands or XML messages to the listener agent 206 at step 406.

The listener agent 206 receives the customized commands or XML messages, and extracts relevant parameters for identifying one or more of the relevant job-control APIs 208. The listener agent 206, at step 408, invokes the relevant job-control APIs 208 to access the DI server 102, and communicate the request. The DI server 102 subsequently executes the DI job by employing the job-control APIs 208 associated with the second application 204 at step 410. In one embodiment, the listener agent 206 can transmit an acknowledgement of initialization or termination of the DI job from the second application 204 to the first application 202. The listener agent 206, thus, by employing the job-control APIs 208 and the DI server 102, extends the ability of remotely executing a DI job in one enterprise application to all other enterprise applications.

Figure 5:
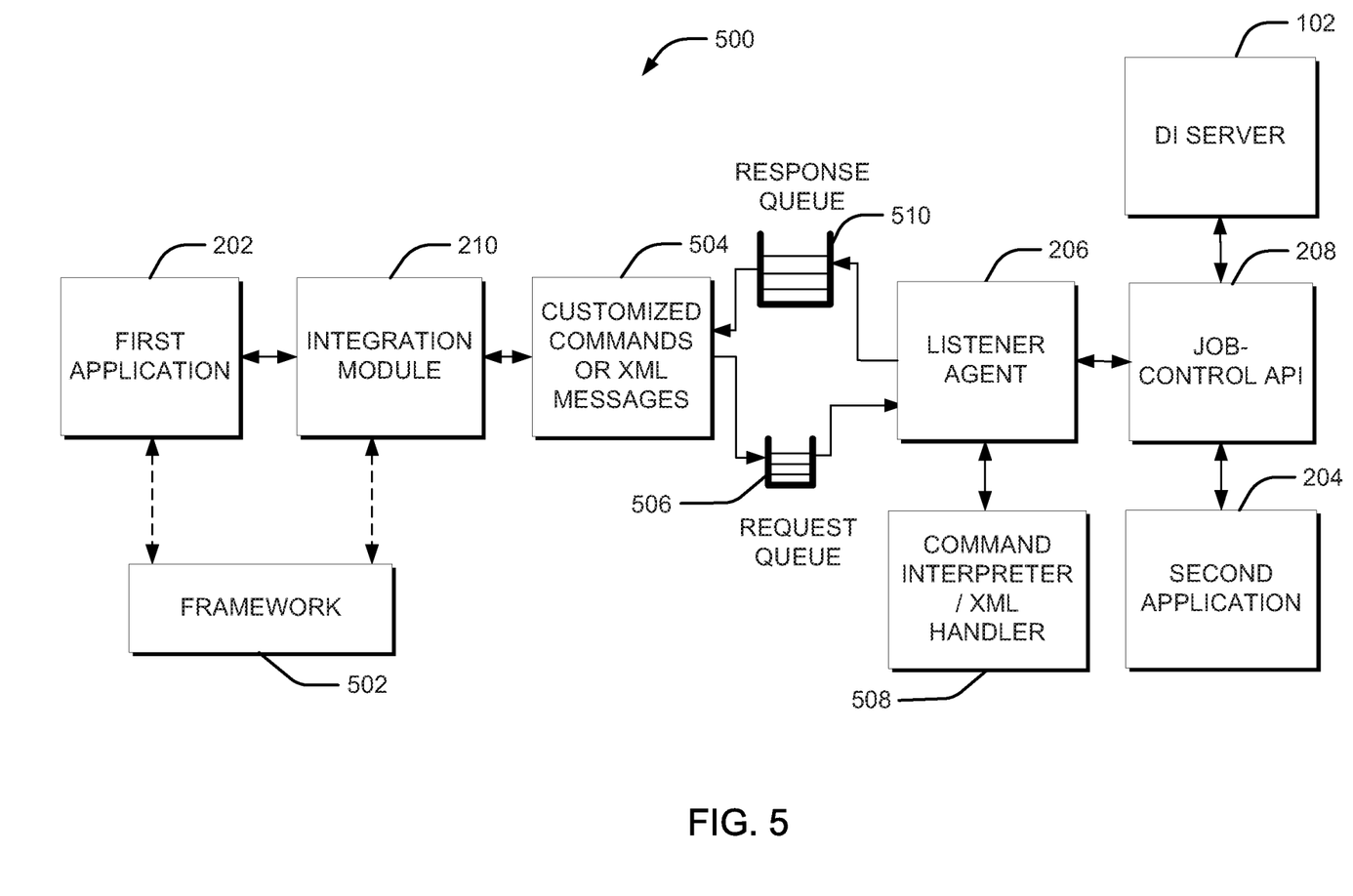
FIG. 5 is a block diagram illustrating an exemplary embodiment of a method for remotely monitoring and scheduling DI jobs with reference to various components in an exemplary DI environment.

FIG. 5 illustrates an embodiment of a method 500 for remotely monitoring and scheduling DI jobs in the second application 204 with reference to various components in an exemplary DI environment An enterprise DI environment can include a framework 502 for providing the first application 202 with the integration module 210 adhering to a specified set of specifications. In one embodiment, the framework 502 can be implemented as a J2EE (JAVA™ Platform, Enterprise Edition) application providing various functionalities including a unified security model and transaction control mechanisms. The framework 502 provides an extensible and reusable architecture for integration modules that can be used for further customization across all enterprise applications. All integration modules derived from the framework 502 conform to at least the specified set of specifications to communicate with the listener agent 206 by employing specified formats, commands, and protocols. The framework 502 enables design, development, and deployment of the customized integration modules as embeddable client plugins on each enterprise application. The framework 502 can also enable users to add one or more functionalities or components for further customizing the integration modules based on the users' specific requirements. For instance, the framework 502 can provide the first application 202 with the integration module 210 serving as an embedded client in communication with the listener agent 206, serving as a server in the DI environment.

A user can request for remote monitoring or scheduling of DI jobs through the integration module 210, which in some embodiments, can be integrated with the user interface of the first application 202. The integration module 210 provides selectable interfaces to configure the DI job and one or more associated parameters such as scheduled time, output format, notifications etc. The integration module 210 can further include selectable options for generating notifications periodically, or when the DI job changes status. In another embodiment for remotely scheduling or scheduling DI jobs in batch mode, the integration module 210 can provide options to allow the user to receive notifications through email, a popup, or a dialog box when one or more jobs finish.

Once the user configures the request, the integration module 210 customizes the request into a format fit for processing by the listener agent 206. To that end, the integration module 210 processes the request, user credentials, selected options, and the other associated parameters related to the DI job or target applications. The integration module 210, in some embodiments, can append relevant parameters to the user request for remote monitoring or scheduling of DI jobs. These relevant parameters enable the user to remotely login, search, retrieve logs, schedule, or execute DI jobs in the second application 204. Subsequently, the integration module 210 transforms the request including all relevant parameters into customized commands adhering to a custom protocol that can be processed by the listener agent 206. In some embodiments, standard protocols such as Uni-casting or remote method invocation (RMI) facilitate communication between the listener agent 206 and the integration module 210. Other embodiments employ the custom protocol including one or more customized commands or XML messages 504 supported by both the listener agent 206 and the integration module 210. The customized commands or XML messages 504 can include requests for authenticating a particular client session, enabling querying of DI jobs, retrieving logs of DI jobs in the second application 204, and so on. In some embodiments, the integration module 210 transmits the customized commands or XML messages 504 to the listener agent 206 using the custom protocol, or stores in a request queue 506 for later processing.

The listener agent 206 processes the request and extracts relevant information related to user access, requested DI job and the second application 204. A command interpreter or an XML handler 508 aids the listener agent 206 in interpreting and extracting relevant parameters from the customized commands or XML messages 504. The parameters can include the DI job identifier such as the DI job schedule, view status, query log, the DI job type, duration or execution time, user credentials, user access modifiers, frequency of execution, output format and any other related parameters. Based on these extracted parameters, the listener agent 206 invokes one or more of the appropriate job-control APIs 208 for accessing the DI server 102 that manages the DI job for servicing the request.

In order to access the DI job, the DI server 102 employs the available job-control APIs 208 associated with the second application 204 to facilitate login, search, or execution access to the DI job. Once the DI job is executing, the DI server 102 fetches requested information related to the DI job from the second application 204. The requested information can include an acknowledgement of initialization or termination of the DI job, the DI job-status, volume of jobs finished, resource utilization, and other such details. The DI server 102, subsequently, transmits the requested information to the listener agent 206. Alternately, once the DI job is executed, the listener agent 206 fetches relevant output relating to the DI job from the DI server 102 through the job-control APIs 208, and transmits the output back to the first application 202 through a response queue 510.

The listener agent 206 can transmit the requested information to the integration module 210 continuously, periodically or once the DI job terminates, and in one or more formats. This measure enables monitoring or scheduling the DI job from the first application 202 at different levels. In some embodiments, the listener agent 206 may transform the information to be transmitted into the customized commands or XML messages 504.

Upon receiving the customized commands or XML messages 504, or the requested information, the integration module 210 interprets and customizes the requested information for user review. The integration module 210 customizes the requested information to a default format suitable for the first application 202, or to a format requested by the user. In some embodiments, the integration module 210 can provide a minimized summary window of the requested information, say, only showing job totals for each remote machine. For example, an output of a request for monitoring DI jobs executing in a SAP application can be viewed from a chat client window. The window can expand to reveal full details of running jobs. This measure makes it very easy to monitor changes in the DI environment without a remote activity window taking up much of the screen space. The method 500, thus, can be extended to include the DI job and process integration for other enterprise applications like COGNOS™, HYPERION™, or other production systems by employing the job control APIs 208 associated with these applications.

The method 500 uses publicly available APIs, and enables tight coupling of the integration module 210 to the listener agent 206, thus, enabling even upgraded DI jobs to be remotely monitored and scheduled without changing any implementation details. The claimed system provides a unique platform for leveraging remote monitoring and scheduling ability of one application to all other applications, thus, providing for a more robust monitoring and scheduling of DI processes in the enterprise.

The methods 300, 400 and 500 depict an exemplary sequence of operations that can be implemented in hardware, software, or a combination thereof. The order in which the methods are described is not intended to be construed as a limitation, and any number of the described blocks can be combined in any order to implement the method, or an alternate method. Additionally, individual blocks may be deleted from the method without departing from the spirit and scope of the subject matter described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for deriving an integration module using an electronic computing device, the method comprising:
   providing a framework coupled with a system of computer hardware for remotely monitoring and scheduling a plurality of data integration (DI) jobs between a plurality of enterprise applications, wherein the framework provides an extensible and reusable architecture for the integration module;
   embedding a first customized integration module in a first of the plurality of enterprise applications, wherein any data generated for a second of the plurality of enterprise applications is made available to and through the first customized integration module;
   adding to the integration module at least one function or component corresponding with a user specified requirement via the framework;
   providing a listener agent electronically coupled with the integration module and a DI server, wherein the listener agent receives one or more customized commands, by the first of the plurality of enterprise applications suitable for accessing the second of the plurality of enterprise application, and monitors or schedules the plurality of DI jobs in any of the plurality of enterprise applications through one or more DI job-control application programming interfaces (APIs) specific to any of the plurality of enterprise applications, wherein the one or more customized commands include at least one or more parameters characteristic of the at least one of the DI job, and wherein the integration module and the listener agent operate in a tightly coupled client-server paradigm;
   deploying the integration module as an embedded client to the second of the plurality of enterprise applications by the framework.

2. The method of claim 1, wherein the framework further provides functionalities selected from the group consisting of: a unified security model and transaction control mechanisms.

3. The method of claim 1, wherein the framework provides the one of the plurality of enterprise applications with the integration module serving as an embedded client in communication with a listener agent, serving as a server in a DI environment, wherein the integration module transforms a DI job request into one or more customized commands, and wherein the listener agent and the integration module support the one or more customized commands employing a custom protocol.

4. The method of claim 3, wherein the listener agent, by employing a job-control API and a DI server, extends the ability of remotely executing the plurality of DI jobs in one of the plurality of enterprise applications to all other enterprise applications.

5. The method of claim 1, wherein the integration module provides selectable interfaces to configure any of the plurality of DI jobs and at least one associated parameter.

6. The method of claim 5, wherein the at least one associated parameter is selected from the group consisting of: scheduled time, output format, and notifications.

7. The method of claim 1, wherein the integration module provides selectable options for generating notifications periodically.

8. The method of claim 1, wherein the integration module provides batch mode notifications for the plurality of DI jobs selected from the group consisting of: an email, a popup, and a dialog box.

9. The method of claim 1, wherein the integration module is configured to process any of the group consisting of: a user request, a user credential, and a selected option.

10. The method of claim 9, wherein the integration module appends relevant parameters to the user request.

* * * * *